May 20, 1941.　　　　M. RUGGIERI　　　　2,242,758
LAG SCREW
Filed March 25, 1940
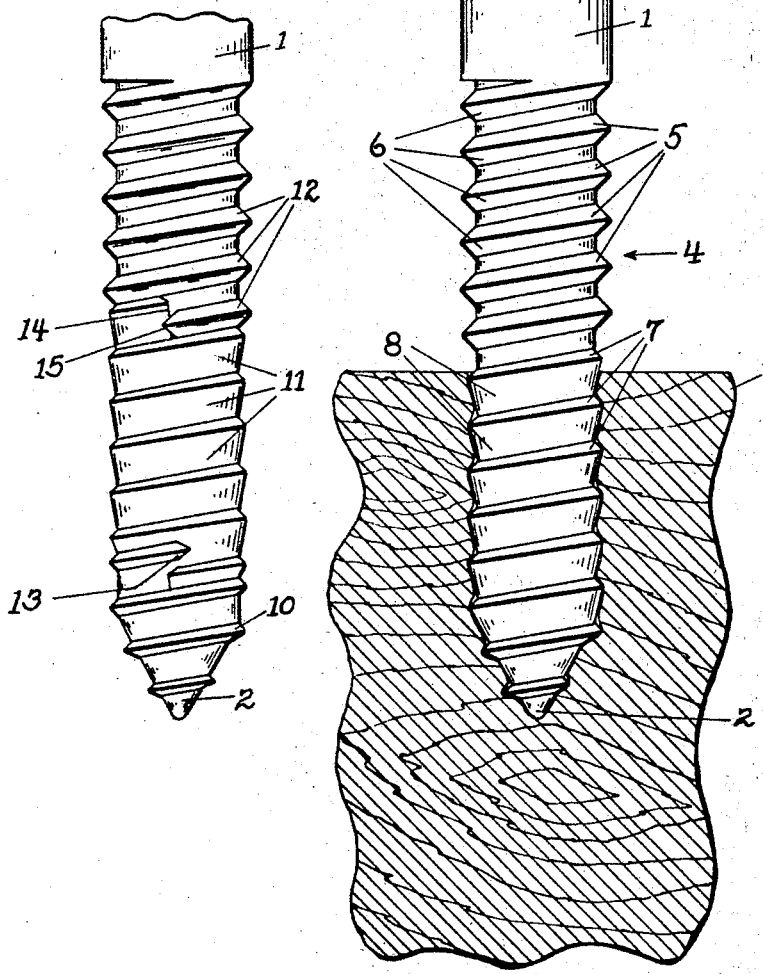
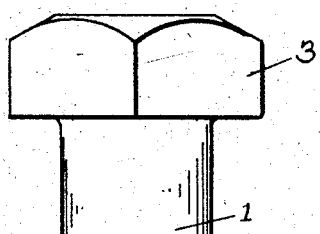
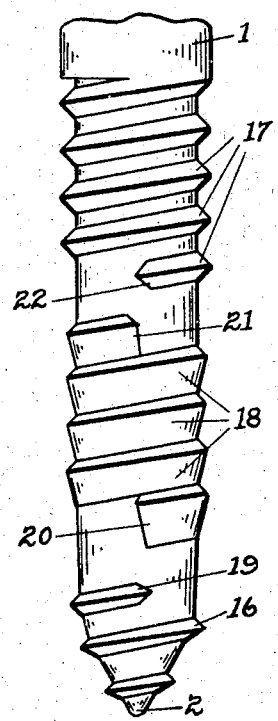
INVENTOR.
Michael Ruggieri
BY Chester W. Brown
ATTORNEY.

Patented May 20, 1941

2,242,758

UNITED STATES PATENT OFFICE 2,242,758

LAG SCREW

Michael Ruggieri, Stroudsburg, Pa., assignor to Line Material Company, South Milwaukee, Wis., a corporation of Delaware Application March 25, 1940, Serial No. 325,717

4 Claims. (Cl. 85—46)

This invention relates to improvements in lag screws.

It is common practice to provide lag screws with a continuous length of thread which, by the nature of the thread, allows the screw to be driven in place under hammer impact. This type of thread is referred to in the trade as a "fetter" thread. Another type of lag screw is provided with a continuous length of thread which, by the nature of the thread, requires a rotational movement as by means of a wrench to properly tighten the screw in place. This type of thread is referred to in the trade as a "gimlet" thread.

It may be readily understood that under certain conditions of installation a lineman may drive a fetter type lag screw into place by means of hammer blows in less time than it takes to position a gimlet type lag screw by means of a wrench. However, the former screw does not possess as great a holding power in the medium in which it is positioned as does the latter screw.

I have discovered it to be advantageous to combine the salient features of each thread and, accordingly, an object of this invention is to provide for a lag screw a threaded portion comprising a gimlet and fetter type thread combined in such a manner as to permit setting of the screw by means of hammer blows and then permit positive anchorage of the screw by means of a wrench.

More specifically, it is an object to provide for a lag screw having a piercing point, a threaded portion comprising a length of thread alternating as a gimlet type thread and then as a fetter type thread, whereby the screw may be driven into position for a greater part of its length by hammer impact and then firmly set in place for the remainder of its length by rotation with a wrench.

Another object is to provide for a lag screw, an interrupted length of thread alternating in form as a series of gimlet and fetter type threaded portions, whereby the fetter portions acts to automatically provide a bore into which the gimlet portion may be securely threaded.

In the drawing:

Fig. 1 is a plan view of one form of my improved lag screw.

Fig. 2 is a plan view of another form of my improved lag screw with parts broken away.

Fig. 3 is a plan view of a further form of my improved lag screw with parts broken away.

Like parts are identified by the same reference numerals throughout the several views.

Fig. 1 shows a lag screw comprising a cylindrical shank 1 which tapers into a piercing point 2 at the lower end and is provided at the upper end with a squared head 3.

A continuous length of thread, designated generally by the numeral 4, is provided on the surface of the shank 1 in any convenient manner, as by rolling or by cutting with a multiple collapsible die, and which extends from the point 2 in the form of a helix about the shank toward the head 3 for a plurality of turns as shown.

The thread 4 is formed on the point 2 and on the upper portion of the shank 1 as a gimlet thread having a drive face 5 and a periphery 6 cut or rolled at substantially 90 degrees relative to each other.

Intermediate the gimlet thread portions the thread 4 is formed on the lower portion of the shank 1 as a fetter thread having a drive face 7 and a periphery 8 which are cut or rolled at an angle substantially greater than 90 degrees relative to each other.

It may be noted that the bearing area of the surface 7 is relatively smaller than the bearing area of the surface 5 and that the area of the periphery 8 is comparatively greater than the area of the periphery 6. It may also be observed that the diameter of the upper gimlet threaded portion is relatively greater than the diameter of the fetter thread portion and the diameter of the fetter thread portion is greater than the diameter of the gimlet thread portion on the point 2.

By providing the dimensional differences between the different threaded sections, the screw may be driven into the wood 9 by hammer impact against the head 3 up to the last turn of the fetter threaded section.

The fetter section acts as a wedge and forces the wood fibres apart and forms a bore into which the upper gimlet threads may be threaded.

After the screw has been preliminarily set into the wood 9 or any other suitable material to which it is desired to fasten an object, it is rotated by means of a wrench at the head 3 until the gimlet threads thread into the bore left by the fetter threaded portion.

It may be noted that the sharp-angled gimlet threads, having a greater diameter than the fetter threaded portion, will be forced into intimate contact with the wood fibres 9 and thereby provide positive anchorage for objects supported by the screw.

Fig. 2 shows a fragmentary view of a lag screw having a shank 1 upon which are provided overlapping lengths of thread 10, 11 and 12. The gimlet type thread 10 is formed on the point 2 in a manner similar to that described for Fig. 1 and coils as a helix upwardly about the shank 1 where it terminates at 13 and overlaps the fetter type thread 11. The fetter type thread coils upwardly as a helix about the shank 1 and terminates at 14 where it is overlapped by the gimlet thread 12 which originates at 15 and continues throughout the remainder of the threaded portion.

The lag screw is set and anchored in a manner similar to that described in reference to Fig. 1.

Fig. 3 shows a further modification of my lag screw wherein the shank 1 is provided with a threaded portion comprising two sections of gimlet thread 16 and 17 and a section of fetter thread 18 intermediate the sections 16 and 17.

The gimlet section 16 terminates at 19 and is spaced from the originating end 20 of the fetter section 18. The terminal end 21 of the fetter section is spaced from the originating end 22 of the gimlet section 17.

The lag screw is set and anchored in a manner similar to that described in reference to Fig. 1.

It may be noted that the three forms of screws are all provided with piercing points 2 provided with the gimlet type of thread. This provision is made so that the screw may quickly thread into the wood as it is rotated into anchored position by means of a wrench after it has been partly driven into the wood 9 by hammer impact.

From the foregoing description, it appears that the objects of this invention have been accomplished by providing a lag screw having a threaded shank formed alternately to provide a fetter section and a gimlet section of thread, whereby the screw may be first driven in place by reason of the fetter threaded section and then rotated into positive anchored position by reason of the gimlet threaded section.

I claim:

1. A lag screw comprising a drive head, a tapered body portion, a piercing point, said body portion being provided with a gimlet and fetter type thread, and said point being provided with a gimlet type thread, said threads forming a continuous helix on said screw.

2. A lag screw comprising a body portion, overlapping lengths of threads forming separate threaded sections, said lengths of threads being formed to provide gimlet and fetter threaded sections, said screw being driven by hammer impact into pre-set position by reason of said fetter section and rotated into positive anchored position by reason of said gimlet section.

3. A screw comprising a driving head, a tapered body portion, a piercing point, said piercing point being provided with a gimlet type thread, and said body portion being provided with a fetter type thread extending from said gimlet type thread on said point and with a gimlet type thread extending from said fetter type thread remote from the first mentioned gimlet type thread, said threads each being disposed in a helical path progressing said threads uniformly toward said head.

4. A screw comprising a driving head, a body portion, and a piercing point, said point having a gimlet type thread and said body portion having a fetter type thread extending from said gimlet type thread on said point and having a gimlet type thread extend from said fetter type thread at a point remote from the first mentioned gimlet type thread, each of said threads defining a helix advancing toward said head substantially equal to the rate of advance of the helices of the other of said threads.

MICHAEL RUGGIERI.